Patented Dec. 31, 1946

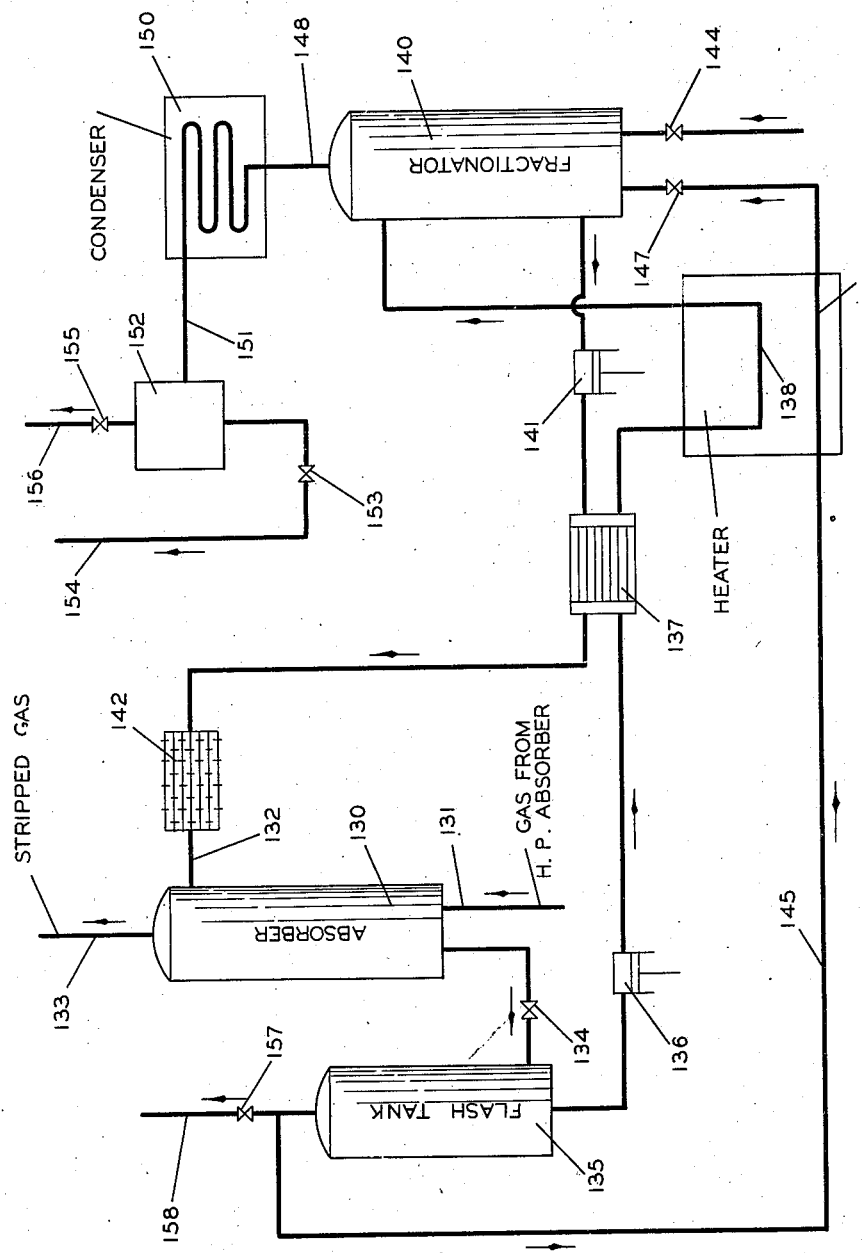

2,413,503

UNITED STATES PATENT OFFICE 2,413,503

ABSORPTION PROCESS

Donald La Verne Katz, Ann Arbor, Mich., assignor to Phillips Petroleum Company, a corporation of Delaware Application March 28, 1942, Serial No. 436,647

3 Claims. (Cl. 196—8)

This invention relates to a process for separating or recovering desirable liquefiable constituents from high pressure gases.

The recent discovery of high pressure gas fields, particularly in the region of the Gulf coast, has stimulated interest in the recovery of desirable liquefiable constituents from the gas at high pressures. Because of statutory regulations concerning the production of gas and the realization by the industry that it is desirable, whenever possible, to conserve the original reservoir pressure, particularly in reservoirs in which the gas is saturated with heavier components, cycling of the processed gas has been widely adopted. Condensation and absorption processes have been developed which permit recovery of the desirable components at pressures within the range of 800–1200 pounds per square inch. At present 1200 pounds per square inch appears to be the upper pressure limit of the recovery processes. The pressure of the gas is often much higher than 1200 pounds per square inch; some of the well head pressures are within the range of 3000–6000 pounds per square inch. When the produced gas at the high pressures is processed and cycled, its pressure must be first reduced to the process pressure, then raised by compressors to a pressure as high as or higher than the original well head pressure for injection into the producing reservoir. The high pressure, large volume compressors required to handle the residue gas from a commercial installation represent a large investment. Consequently, only those reservoirs which economically justify the large required investment can be developed.

The operating pressure of conventional absorption processes is limited by the tendency for absorber oil to vaporize at high pressures. It is known that conventional absorber oils will vaporize to an appreciable degree if natural gas at pressures of 3000 to 6000 pounds per square inch is brought into equilibrium with the oil. A high molecular weight and high boiling oil can be prepared which will vaporize under these conditions to only a limited degree. However, circulation of such oils is a more costly process and is less efficient per unit weight for scrubbing such constituents as butane, pentane, etc., from the gas than lower molecular weight oils. The present invention retains the advantages of conventional absorption without the disadvantages accompanying high pressures by employing a plurality of absorption oils in series; the first, to recover those constituents from the gas phase which are substantially in the gasoline boiling range; a second oil which removes those constituents from the gas which are substantially in the same boiling range as the first absorber oil; and possibly a third oil which removes constituents from the gas which are substantially in the same boiling range as the second absorber oil.

An object of this invention is to provide a method of recovering desirable liquefiable constituents from gases at high pressures.

Another object of the invention is to provide apparatus suitable for carrying out the method of my invention.

A further object of this invention is to provide an absorption system to recover desirable constituents from gases at high pressure.

A still further object of this invention is to provide suitable absorbents for use in the absorption system of the invention.

These and other objects and advantages will be evident from the following detailed description.

The process of the present invention permits recovery of desirable constituents at pressures higher than those at which it has been possible heretofore to operate absorption processes. By means of this invention it is now possible to recover desirable liquefiable constituents at pressures in the range of 1000 to 5000 pounds per square inch, or higher, by use of absorption methods so that the stripped gas may be available at this high pressure for reservoir pressure maintenance. The advantage of the present method is that high pressure absorption may be accomplished without material loss of absorption oil. Use of controlled composition absorption oils in series permits operation of absorption processes at extremely high pressures with a minimum of loss of absorption oil and practically complete stripping of the gas.

High pressure vapor-liquid equilibria experiments are a great aid in the understanding of the behavior of oil-gas mixtures. At present, the field of investigation is in the range of pressure from 2000 to 10,000 pounds. Katz and Singleterry, A. I. M. E. Pet. Dev. & Tech., 1938, showed that two phases would exist for normal mixtures of crude oil and natural gas at pressures 8000 to 9300 pounds and indicated that pressures of 15,000 pounds or more would be required to reach a single phase. Webber, A. I. M. E. Pet. Dev. & Tech., 1941, and the discussion of his paper by Katz and Standing shows more recent knowledge on the subject. Webber shows clearly that which Katz and Singleterry indicated; namely that the vaporization of a normally liquid substance such as absorber oil depends materially on the composition of the phases present or upon the system from which the phases result at any temperature and pressure. Any change in composition which increases the apparent convergence pressure of the equilibrium constants on an isothermal plot of K vs. pressure will cause a lower tendency of the less volatile constituents to vaporize or lower K's.

It is known for example that in the two mixtures shown, in the table, the vaporization constant, K, or mol percent in the vapor divided by the mol percent in the liquid for the 400 to 500 boiling range material is lower in the system A than in system B at pressures in the range of 2000 to 6000 pounds and normal absorber temperatures.

Table

| Constituent | Mol per cent | |
|---|---|---|
| | System A | System B |
| Methane | 94.0 | 94.0 |
| Ethane | 1.9 | 1.9 |
| Propane | .9 | .9 |
| Butane | .2 | .2 |
| Fraction boiling in range of 400 to 500° F | .8 | .8 |
| Fraction boiling in range of 500 to 650° F | .1 | 2.1 |
| Fraction boiling in range of 650 to 850° F | 2.1 | .1 |
| | 100.0 | 100.0 |

In other words, there would be a greater concentration of the 400 to 500° F. boiling fraction in the vapor state for the systems in equilibrium at 90° F. and 3500 pounds per sq. in. for system B than for system A due to the change in the boiling range of the heavier constituents.

Also, the higher boiling fractions in general have lower K's. The heptane and heavier K often used to express an overall characteristic of the less volatile fraction is very much lower for higher boiling substances in the above illustrated system A than in system B even at constant temperature, pressure, and convergence pressure of the system. These two principles may be employed to outline a process of high pressure absorption which prevents loss of absorber oil in the high pressure gas by novel methods to be disclosed. For a more complete understanding of the principles involved, reference to the literature relative to equilibrium constants in hydrocarbon mixtures is recommended.

Figure 1 of the drawings is a diagrammatic elevational view of an absorption system representation of the principles involved in the present invention.

Figure 3 is a flow diagram of an auxiliary absorption system constructed in accordance with the present invention for processing residue gas from a conventional absorber operated at abnormally high pressure.

Figure 1:
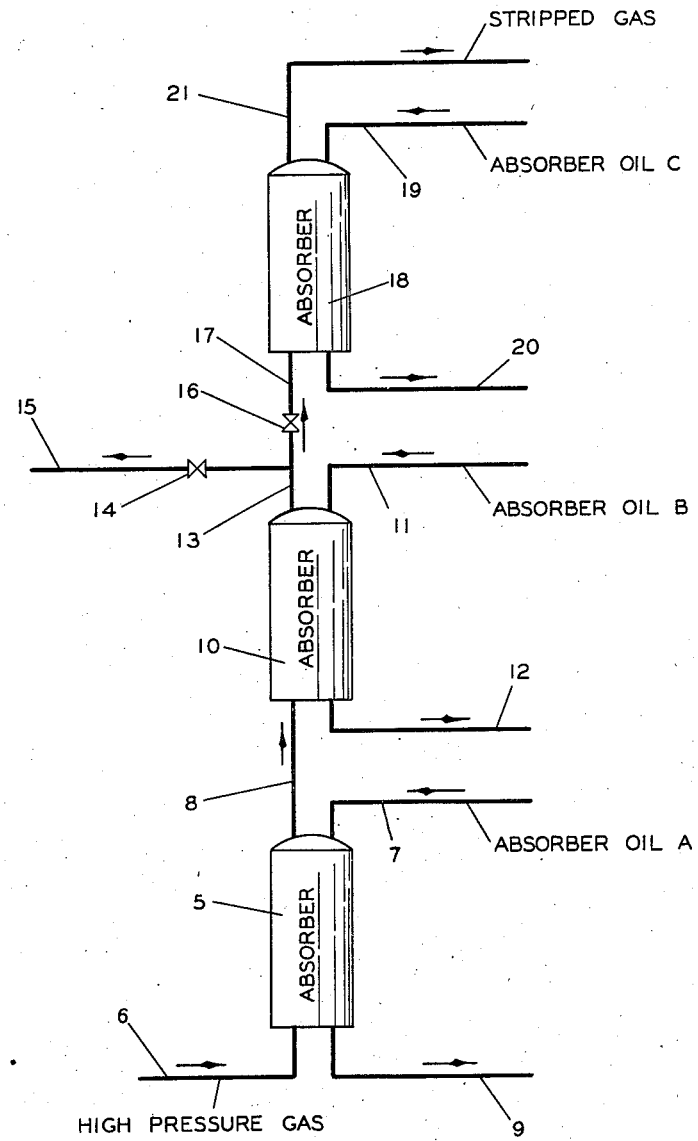

With reference to Figure 1, high pressure gas to be processed enters the base of absorber 5 through pipe 6. The high pressure gas is intimately and countercurrently contacted in the absorber by lean absorbent, designated "Absorber oil A" entering the top of the absorber through the pipe 7. The absorber 5 is provided with bubble trays or plates which insure several contacts between the gas and the absorbent. The gas from absorber 5 leaves the top of the absorber through the pipe 8. Rich absorbent containing liquefiable constituents removed from the gas is withdrawn from the base of the absorber through the pipe 9. Thus far the system represents substantially the absorption section of a conventional absorption plant. Lean absorber oil normally comes into equilibrium with the stripped gas leaving the top of the absorber. Absorber oil A, for example, entering absorber 5 normally approaches equilibrium with the gas leaving the top of the absorber through pipe 8.

If the absorption pressure is 1000 pounds per square inch the concentration of the oil as vapor in the gas leaving the absorber through pipe 8 is very small because the K for the oil is low at this pressure and normal temperatures of 80 to 100° F. However, if the pressure is increased to 4000 pounds per square inch, the K for the oil is considerably higher than at 1000 pounds, the amount depending primarily upon the convergence pressure of the gas leaving the absorber. In either case the gas is at its dew point with respect to the absorber oil and reduction in pressure of the gas would cause retrograde condensation of the oil provided the pressure in the absorber is within the retrograde condensation range of the system. Retrograde condensation, as referred to herein is in accordance with the nomenclature set forth in the article "Retrograde condensation," Katz & Kurata, Ind. & Eng. Chem., vol 32, p. 817 (1940). One might consider the control of the volatility which could be made by control of the main absorber oil composition. However, the novelty of this process is that it permits use of oils relatively conventional and economical to circulate with subsequent removal of the vaporized absorber oil from the gas flowing through pipe 8.

Consider, for example, the case of high pressure gas at 4000 pounds being processed for volatile constituents such as gasoline and kerosene fractions by a conventional high pressure absorption process at 4000 pounds in the absorber 5. Webber A. I. M. E. Pet. Dev. and Tech., 1941, shows that the oil used in his investigations would vaporize to the extent of about one-half to three-fourths gallons of oil per 1000 standard cu. ft. passing through pipe 8. This is the reason high pressures above 1200 to 1500 pounds are considered impractical. Better stripping of oil A can decrease this quantity vaporized.

In accordance with the present invention the gas leaving pipe 8 is passed to second absorber 10 in which it is contacted with a second absorbent, absorber oil B, which has been chosen in accord with the principles described above. The absorber oil B enters the top of absorber 10 through the pipe 11. The absorber 10 is provided with a series of trays or bubble plates which insure intimate countercurrent contact between the absorber oil entering the top of the absorber and the gas entering the base of the absorber through pipe 8. The rich absorbent from absorber 10 is withdrawn through the pipe 12. Gas leaves the top of absorber 10 through the pipe 13. Oil B will normally be of a higher boiling range which decreases its volatility, or K, due to both the boiling range and the increase in convergence pressure of the K's with the composition of the system comprising the gas leaving the top of absorber 10 through pipe 13 and the absorber oil B entering the top of the absorber through pipe 11. The gas leaving absorber 10 is approximately at its dew point with regard to absorber oil B but the concentration of oil B may be down to 0.02 to 0.10 gallon per thousand cu. ft. of gas leaving the absorber through pipe 13. This gas may in turn be processed by another absorption oil which is of lower volatility than the absorption oil used in absorber 10. With further reference to Fig. 1, the gas leaving absorber 10 through the pipe 13 may be withdrawn from the system as a processed or residue gas through the valve 14 and pipe 15. To recover the absorber oil B remaining in the gas flowing through pipe 13, the gas may be passed through the valve 16 and pipe 17 to the absorber 18. In absorber 18 the gas from absorber 10 is intimately and countercurrently contacted with a third absorbent, designated "Absorber oil C," which enters the top of absorber 18 through the pipe 19. The enriched absorbent from the absorber 18 is withdrawn through the pipe 20 at the base of the absorber. The stripped, lean residue gas at substantially the initial or inlet pressure is withdrawn from the top of absorber 18 through the pipe 21. It is to be understood that Fig. 1 is illustrative only, and that the absorption may be carried out at any desired pressure. The absorber oil C supplied to the absorber 18 may be a low viscosity lubrication oil or bright stock prepared for the purpose. The stripped gas leaving the top of absorber 18 through the pipe 21, if the absorption is carried out at 4000 pounds per square inch, is as free of normally liquid hydrocarbons as is the usual lean gas leaving the conventional absorption system operated at 1000 pounds per square inch.

One notable advantage of the second and third absorbers is that the rich oil contains nothing boiling between the undesired constituents in the gas and the initial boiling constituents in oil A. Therefore, reduction in pressure such as by a "flash and flood" process will separate the gas and the oil permitting processing of the oil free from natural gas. However, it may be advantageous to pass the rich oil from absorber 18 into absorber 10 and the rich oil from absorber 10 into absorber 5. The latter would be in effect a single absorber with successive additions of absorber oils which more completely relieve the gas of its normally liquid constituents than has been possible hitherto.

As example not limiting the process but merely as one example would be oil A of 200 molecular weight, oil B of 350 molecular weight, and oil C of 500 molecular weight with corresponding boiling ranges, the increase in molecular weight being accomplished by adjusting the boiling range of the oil including successively higher initial boiling ranges. Expressed in terms of boiling ranges, the absorbents would boil substantially within the following temperature ranges; 400 to 600° F. for oil A, 600 to 850° F. for oil B, and 800 to 950° F. for oil C with A. P. I. gravities of about 42, 29, and 22, respectively. The base of the oil or chemical character may be selected to give a maximum absorption ability on a weight or volume basis; a selection of this type may also be necessary in order to have the viscosity of oil C sufficiently low at the permissible operating temperatures to insure satisfactory operation.

In a two-stage high pressure absorption process, operating at, for example, 2000 to 5000 pounds per square inch, wherein the lower molecular weight absorption oil may have a molecular weight of about 200, as mentioned above. This value need not be exactly 200, but may vary between such approximate limits as, for example, 180 to 280. Similarly, the higher molecular weight, low viscosity oil, may have a molecular weight of say 500, but may be selected from low viscosity oils having molecular weights from 300 to 600.

Likewise, in a three-stage high pressure process, operating at pressures within the range, of say 3000 to 6000 pounds per square inch, the first stage absorber oil may have a molecular weight of approximately 200, but may vary within the limits of say, 180 to 300; the second stage absorber oil may have a molecular weight of about 350, but may vary from approximately 250 to 450; while the third stage, low viscosity absorber oil, may have a molecular weight of about 500, it may vary within the limits of about 400 to 700.

The absorption device may be conventional bubble plate absorbers, and heat exchangers, intercoolers on the gas or oil, or other features which would facilitate the operation may be used.

Figure 2:
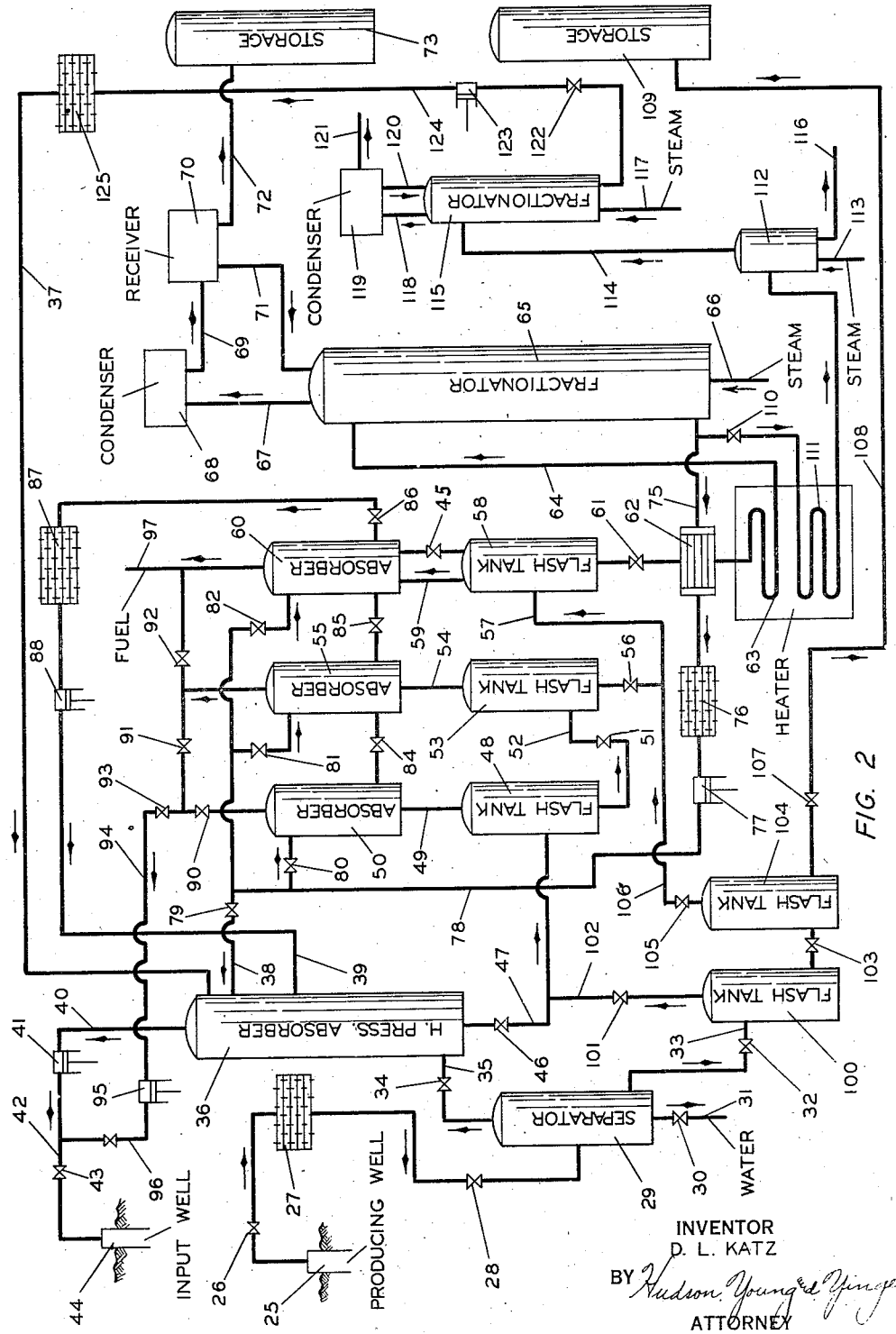
Figure 2 is a flow diagram of a plant for processing high pressure gas in accordance with the present invention.

Figure 2 is a flow diagram of an absorption plant operating on gas from a high pressure condensate well and utilizing the advantage of the process of this invention. Effluent of the well 25 passes through the control valve 26 to the cooling coil 27 where it is cooled if at high temperature and from which it is passed through valve 28 to a separator 29, at substantially the pressure desired for the absorption process, for example, 4000 pounds per square inch. In the separator, water and any hydrocarbon liquids are removed from the gas stream and separated. The water is withdrawn from the bottom of the separator through valve 30 and pipe 31; the hydrocarbon liquids, through valve 32 and pipe 33; gas, through valve 34 and pipe 35. The gas from the separator enters the base of the absorber 36, which is preferably of the plate or bubble tray type, and in which it is contacted with a plurality of absorbents. At the top of the absorber, a stream of low viscosity, high molecular weight absorbent, processed as will be subsequently described in detail, is introduced through the pipe 37 to remove absorption oil vapors and substantially all of the desired constituents. At a point somewhat below the top of the absorber, conventional absorption oil is admitted to the absorber through the pipe 38. An absorbent containing some desirable constituents may be introduced to the absorber through the pipe 39 which enters the absorber at a point somewhat below the point of entry of the conventional absorbent. The gas flowing up through the absorber is contacted first, relative to gas flow, with the combined stream of all the absorbents entering the absorber; then, with the combined stream comprising the stripped absorbents entering through pipes 38 and 37; and finally, with the absorbent prepared in accordance with this invention and entering the top of the absorber through pipe 37. The stripped gas leaves the top of the absorber through pipe 40, from which it may be cycled to the producing formation. The compressor 41 raises the pressure of the gas, if necessary, to that required for injection into an underground reservoir and the gas is then passed through pipe 42 and valve 43 to the input well 44. The rich oil is withdrawn from the base of the absorber 36 through the control valve 46 and is passed through the pipe 47 to the high pressure flash tank 48. Gases and vapors released in the high pressure flash tank are passed through the pipe 49 to an auxiliary absorber 50 operated at substantially the same pressure as that of the flash tank. The liquid from the flash tank 48 is passed through valve 51 where its pressure is reduced and through pipe 52 to a second, intermediate pressure flash tank 53 at somewhat lower pressure. The vaporous effluent of the second flash tank 53 is passed through the pipe 54 to the base of the second auxiliary absorber 55 operated at substantially the same pressure as flash tank 53. The liquid from flash tank 53 passes through the valve 56, where a further pressure reduction occurs, and flows through pipe 57 into the low pressure flash tank 58. The vapors evolved in the low pressure flash tank 58 pass through pipe 59 to the low pressure absorber 60 operated at substantially the same pressure as flash tank 58. The flashed absorbents, containing absorbed components, are withdrawn as liquid from the flash tank 58 through valve 61 and passed through the heat exchanger 62, the heating coil 63 and pipe 64 to the bubble plate fractionator 65. In the fractionator, the conventional absorbent is stripped to the desired degree with the aid of steam admitted to the base of the fractionator through the pipe 66. The desirable constituents removed from the absorbent in the fractionator pass overhead through pipe 67 to the condenser 68. Condensate from the condenser flows through pipe 69 to the receiver 70 from which a part may be returned to the fractionator through pipe 71 as reflux while the remainder passes through pipe 72 to the storage container 73.

Stripped absorber oil, having approximately the properties of conventional absorption oil is withdrawn from the base of the fractionator through the pipe 75, the heat exchanger 62, and cooler 76 to the pump 77 from which it is passed through pipe 78 and distributed as desired through the valve 79 to the main absorber 36, through valve 80 to the high pressure auxiliary absorber 50, through valve 81 to the intermediate pressure auxiliary absorber 55, and through valve 82 to the low pressure auxiliary absorber. The rich oil from the base of the high pressure absorber 50 is passed through the valve 84 to the base of the absorber 55. Any desirable constituents released from the absorbent upon pressure reduction is reabsorbed at the lower pressure. Similarly, the rich oil from the base of absorber 55 is passed through the valve 85 to the base of the low pressure absorber 60. The combined streams of rich oil from the auxiliary absorbers are withdrawn from the base of the low pressure absorber 60. The rich oil may be passed through valve 45 to join the unvaporized liquid in flash tank 58 or through valve 86 and cooler 87 to the pump 88 from which it passes through pipe 39 to the main absorber. The dry residue gases from the tops of the auxiliary absorbers pass through the various pressure and flow control valves 90, 91, 92, and 93; through pipe 94 to the compressor 95; and through the pipe 96 to join the stripped gas in pipe 42 for injection into the reservoir. Gases for use as fuel may be conveniently taken from the top of the lower pressure absorbers in the series of auxiliary absorbers through the pipe 97.

The hydrocarbon liquids separated from the gas stream in the separator 29 flow through valve 32 and pipe 33 to a high pressure flash tank 100 operated at substantially the same pressure as that at which the high pressure flash tank 48 is operated. Gases and vapors evolved in the flash tank 100 pass through valve 101 and pipe 102 to pipe 47 join the rich oil stream passed to the flash tank 48. Liquid from flash tank 100 passes through valve 103 to a lower pressure flash tank 104. The flash tank 104 is operated at substantially the same pressure as that of the low pressure flash tank 58. Vapors from the flash tank 104 pass valve 105 and flow through pipe 106 to pipe 57 where they join the liquid feed to flash tank 58. The liquid from flash tank 104 may be passed through valve 107 and line 108 to the storage tank 109.

The absorbent with which final contact of the gas is made in the main absorber is prepared as follows. A portion of the stripped absorbent from the base of the fractionator is withdrawn through valve 110 and passed through the coil 111 of the heater to the flash pot 112. Steam is supplied to the flash pot through pipe 113. In the flash pot all but the heavy constituents or tarry residue is vaporized and passed through the pipe 114 to the fractionator 115. The heavy residue remaining in the flash pot is withdrawn through pipe 116. In the fractionator, which is provided with bubble plates, the feed entering pipe 114 is further stripped with steam entering the fractionator through pipe 117. Vapors from the top of the fractionator pass through pipe 118 to the condenser 119. The reflux necessary for proper operation of the fractionator is returned to the fractionator through pipe 120. The remaining condensate from the condenser, comprising constituents of the conventional absorber oil, desirable heavy constituents from the gas, which may not have been completely removed from the absorber oil in fractionator 65, is withdrawn from the condenser through pipe 121. The condensate may be passed to storage or to a fractionator for separation of the conventional absorber oil and the desirable constituents admixed therewith. Generally, there will be produced an amount of components suitable for use as absorber oil in excess of the amount required for makeup of loss because of the efficiency of absorber oil recovery by the present invention. It is to be noted that in the preparation of the absorbent of high molecular weight, a part of the conventional absorber oil stream is withdrawn and the undesirable residue removed therefrom in the flash pot 112. This serves to recondition the absorbent streams, preventing the accumulation of large percentages of undesirable heavy constituents in the absorbent, which constituents tend to increase the viscosity of the absorbent. Thus, there is continuously prepared a low viscosity absorbent having a high boiling range and high molecular weight. The absorbent stream from the base of the fractionator 115 is withdrawn through valve 122 to the pump 123, from which it is passed through pipe 124, cooler 125 and pipe 37 to the top of the main absorber 36.

As a specific example, not in any way limiting the present invention, assume that the well head pressure at the producing well 25 is approximately 4000 pounds per square inch. The separator 29 is operated at 4000 pounds per square inch and the main absorber 36 is operated at substantially the same pressure, making high pressure gas available at the compressor 41 for cycling to the formation. The gas pressure need be raised by the compressor only the amount necessary to produce the desired flow of gas through the system. The small amount of pressure increase required, and the high volumetric efficiency of the compressor at the high intake pressure greatly reduce the investment required for the compressor installation. The rich oil from the main absorber is flashed in stages; at 1000 pounds per square inch in the high pressure flash tank 48, at 250 pounds per square inch in flash tank 53 and at 100 pounds per square inch in flash tank 58. The absorbents are stripped of absorbed components in the fractionator 65 at about 40 pounds per square inch pressure. The flash tank 100 operates at the same pressure as flash tank 48, 1000 pounds per square inch. Flash tank 104 is operated at about 100 pounds per square inch. The absorbent stream withdrawn through valve 110 is flashed at 5 pounds per square inch in the flash pot 112 and stripped at substantially atmospheric pressure in the fractionator 115.

Figure 3 shows the application of the present invention as a supplement to conventional absorption processes. The conventional absorption process is limited in the pressure at which the absorber may be operated by the vaporization and loss of the absorbent at high pressures. By use of the apparatus of Figure 3, the conventional absorption process may be economically operated at pressures greatly exceeding those at which they are normally limited. The gas from the conventional absorber carrying absorption oil vapors at high pressure, for example 3500 pounds per square inch, enters absorber 130 through pipe 131, is contacted with an absorbent entering the top of the absorber through the pipe 132, and leaves the absorber, substantially free of absorption oil, through pipe 133 at about its initial pressure. The enriched absorbent leaving the absorber is reduced in pressure by valve 134 to a low pressure, for example atmospheric pressure to 200 pounds per square inch, and is passed to flash tank 135. The absorbent containing the absorbed constituents retained after flashing is pumped by the pump 136 through the heat exchanger 137 and heating coil 138 to the fractionator 140. In the fractionator, the absorbent is stripped of the absorbed constituents, and the lean absorbent is passed by pump 141 through the heat exchanger 137 and the cooler 142 to the pipe 132, from which it enters the top of absorber 130. Steam or gas may be admitted to the fractionator 140 through valve 144 to strip the absorbent, or the substantially dry gas from flash tank 135 may be passed through pipe 145, heated in the tube 146 of the heater, and admitted to the fractionator through the valve 147. The vapors and stripping gases pass overhead through pipe 148 to the condenser 150. The absorbed constituents evolved from the absorbent in the fractionator 140 are mainly vapors of the absorption oil from the conventional absorption process which precedes operations outlined in connection with Figure 3. These vapors are readily condensible and easily separated from the stripping medium. For this reason dry gas available from the separator 135 or at other points in the plant may be advantageously used as stripping medium rather than the conventional steam. Condensate and uncondensed gases are passed through the pipe 151 to the separator 152 in which the separation takes place. The condensate, recovered absorber oil, is withdrawn from the separator through valve 153 and pipe 154. The gases are removed through valve 155 and pass through pipe 156 to suitable disposal. Gas from the flash tank 135, in excess of that used for stripping are disposed of through valve 157 and pipe 158.

As an example, the rich absorbent from the absorber 130 may have a composition somewhat as follows: 45.0% methane, 4.3% ethane, 1.3% propane, 0.4% butanes through hexanes, 0.1% heptanes and heavier to 300° F. boiling point components, and 48.9% components boiling above 300° F. In this system at 100 pounds per square inch and 100° F. in the flash tank 135 or the separator 152, the evolved gas leaving the system through either unit contains less than .06 gallon of pentanes and heavier per thousand cubic feet of gas. Since the amount of gas evolved is rather small compared to the quantity of gas processed and is relatively lean, gas may advantageously be used as the stripping medium.

An important advantage of the present invention is that the absorption may be accomplished at normal temperatures, for example 50° F. to 200° F., and at the high pressures naturally encountered in production.

The operating temperatures are chosen to avoid the formation of solid gas hydrates. For example, at 4000 pounds a temperature of 75° F. is usually sufficient to prevent hydrate formation even though water is present. At lower pressures, lower temperatures are permitted in accord with published data by Wilcox, Carson, and Katz, Ind. Eng. Chem. and Carson and Katz A. I. M. E. Pet. Tech. 1941. Although dehydration of the gases to be processed is not shown, the invention is not limited to gases containing water vapor.

I claim:

1. A process for separating desirable constituents from condensate well gaseous effluent within the range of 3000–6000 pounds per square inch which comprises the steps of contacting the gas at a first point with a first absorber oil of average molecular weight approximately 180 to 280 to absorb the desirable constituents therefrom, further contacting the gas at a second point with a second absorber oil of low viscosity and average molecular weight about 300–600 to remove vapors of the first absorber oil, the first absorber oil and the second absorber oil becoming mixed at said first point of contacting, stripping the absorbed desired constituents from the mixed absorber oil, returning a portion of said stripped mixed absorber oil to the first contacting step, diverting the remaining portion of the stripped mixed absorber oil and separating it into a heavy residue and low boiling constituents, passing said low boiling constituents to a fractionator and therein separating lower boiling constituents from the low viscosity high boiling absorbent and passing the latter to the further contacting step as said second absorber oil.

2. A process for separating desirable constituents from condensate well gaseous effluent within the pressure range of about 2000–5000 pounds per square inch comprising the steps of passing the gas through an absorption zone having initial and final points relative to gas flow, introducing a high boiling range absorbent boiling from about 600° to 850° F. to the absorption zone at the final point, introducing a stream comprising absorbent boiling from about 400° to 600° F. at an intermediate point of the absorption zone, the high boiling absorbent and the absorbent boiling from about 400° to 600° F. becoming mixed at substantially said intermediate point, passing rich mixed absorbent from the initial point of the absorption zone to a flash zone at a lower pressure, passing liquid effluent of the flash zone to a fractionator for removal of absorbed constituents as vapors therefrom, returning a portion of the liquid effluent of the fractionator to the absorption zone at said intermediate point as the said stream comprising absorbent boiling from about 400° to 600° F., diverting the remaining portion of the liquid effluent of the fractionator and separating bottoms and low boiling constituents therefrom to leave a high boiling range oil and passing this high boiling range oil to the final point of the absorption zone as the high boiling range absorbent.

3. A process for separating desirable constituents from condensate well gaseous effluent comprising the steps of passing the gas at substantially well pressure through an absorption zone having initial and final points relative to gas flow, introducing a high boiling range first absorbent boiling at about 600°–850° F. to the absorption zone at the final point, introducing a stream comprising a second absorbent boiling at about 400° to 600° F. at an intermediate point, said first and second absorbents becoming mixed at substantially said intermediate point, passing rich mixed absorbent from the initial point of the absorption zone to a flash zone at a lower pressure, passing liquid effluent of the flash zone to a fractionator for removal of absorbed constituents as vapors therefrom, returning a portion of the liquid effluent of the fractionator to the absorption zone as said stream comprising said second absorbent boiling at about 400° to 600° F., diverting the remaining portion of the liquid effluent of the fractionator, separating a bottoms and low boiling constituents therefrom to leave a high boiling intermediate fraction and passing this high boiling intermediate fraction to the final point of the absorption zone as the high boiling range absorbent, passing gaseous effluent of the flash zone to an auxiliary absorber, contacting the gaseous effluent in the auxiliary absorber with a portion of said second absorbent and passing this contacted absorbent from the auxiliary absorber to the absorption zone at a point between the initial point and the intermediate point.

DONALD LA VERNE KATZ.